United States Patent
Morales et al.

(10) Patent No.: US 9,363,557 B2
(45) Date of Patent: Jun. 7, 2016

(54) METHODS AND SYSTEMS FOR FORECASTING AND MEASUREMENT OF MEDIA VIEWERSHIP USING A COMBINATION OF DATA SETS

(71) Applicant: Simulmedia, Inc., New York, NY (US)

(72) Inventors: Mario Andres Morales, Santa Cruz, CA (US); Krishna Balasubramanian, Roslyn, PA (US); Yuliya Torosjan, Queens, NY (US); Jackie Kellon Smith, II, Pelham, NY (US); Jeffrey Storan, Brooklyn, NY (US); Donald J. Locker, Lebanon, PA (US); Shaun Delaney Espiritu, Philadelphia, PA (US); Ross Allen Levin, Evergreen, CO (US)

(73) Assignee: SIMULMEDIA, INC., New York, NY (US)

(*) Notice: Subject to any disclaimer, the term of this patent is extended or adjusted under 35 U.S.C. 154(b) by 0 days.

(21) Appl. No.: 13/652,168

(22) Filed: Oct. 15, 2012

(65) Prior Publication Data

US 2014/0109124 A1   Apr. 17, 2014

(51) Int. Cl.
*H04N 21/442* (2011.01)
*H04N 21/466* (2011.01)

(52) U.S. Cl.
CPC ... *H04N 21/44204* (2013.01); *H04N 21/44222* (2013.01); *H04N 21/4662* (2013.01)

(58) Field of Classification Search
CPC ............... H04N 21/44204; H04N 21/44222; H04N 21/4662
USPC .......................................... 725/9–21
See application file for complete search history.

(56) References Cited

U.S. PATENT DOCUMENTS

| | | | |
|---|---|---|---|
| 7,139,723 B2 | 11/2006 | Conkwright et al. | |
| 7,146,329 B2 | 12/2006 | Conkwright et al. | |
| 7,194,421 B2 | 3/2007 | Conkwright et al. | |
| 7,197,472 B2 | 3/2007 | Conkwright et al. | |
| 7,236,941 B2 | 6/2007 | Conkwright et al. | |
| 7,302,419 B2 | 11/2007 | Conkwright et al. | |
| 7,383,243 B2 | 6/2008 | Conkwright et al. | |
| 7,729,940 B2 * | 6/2010 | Harvey et al. | 725/14 |
| 7,739,140 B2 | 6/2010 | Vinson et al. | |
| 7,743,394 B2 * | 6/2010 | Smith et al. | 725/19 |
| 7,970,934 B1 * | 6/2011 | Patel | 725/46 |
| 8,402,482 B2 * | 3/2013 | Woodward et al. | 725/9 |
| 2003/0145323 A1 | 7/2003 | Hendricks et al. | |

(Continued)

OTHER PUBLICATIONS

Neagu, Radu, Forecasting Television Viewership: A Case Study, GE Global Research, 2003GRC039, Mar. 2003, 12 pages.

(Continued)

*Primary Examiner* — Randy Flynn
(74) *Attorney, Agent, or Firm* — Ascenda Law Group, PC

(57) ABSTRACT

Future media viewership is forecast based on time ordered analysis of historical viewership information from an individual or combination of a plurality of data sets. Forecast models having coefficients derived from comparisons of time series representations of data sets across a plurality of time periods and data sources join together disparate data sets. Individual data sets from disparate data sources may be compared to identify possible untrustworthy data or data that requires further investigation. Organizing viewership information in a time series allows for imputing missing data in a respective data set.

18 Claims, 8 Drawing Sheets

(56) References Cited

U.S. PATENT DOCUMENTS

| | | | |
|---|---|---|---|
| 2008/0263578 A1* | 10/2008 | Bayer et al. | 725/9 |
| 2011/0191190 A1* | 8/2011 | Heller et al. | 705/14.68 |
| 2011/0307913 A1* | 12/2011 | Wang et al. | 725/9 |
| 2013/0014148 A1* | 1/2013 | Vinson et al. | 725/14 |
| 2013/0145384 A1* | 6/2013 | Krum et al. | 725/10 |

OTHER PUBLICATIONS

Weber, Rene, Moethods for Forecast Television Vieweing Patterns for Target Audiences., In: Schorr A., Campbell B., Schenk M. (2002): Communication ZResearch in Europe and Abroad-Challenges of the First Decade. Berlin: DeGruyter, 8 pages.

* cited by examiner

US 9,363,557 B2

METHODS AND SYSTEMS FOR FORECASTING AND MEASUREMENT OF MEDIA VIEWERSHIP USING A COMBINATION OF DATA SETS

FIELD OF THE INVENTION

The present invention relates to methods and systems for forecasting of television, website or other media viewership using data obtained from a variety of sources and, in particular, combined using a cross validated time series of such data.

BACKGROUND

Media advertising accounts for a significant portion of the total marketing spend in a number of geographic markets, including the United States. Typically, media advertisements are marketed on the basis of, among other things, estimated reach—the total number of different people or households exposed, at least once, to a television channel (network) or a website page, software application, etc., during a given period of time. Historically, estimated reach has been determined by recording viewing activities of a sample population of a given medium's audience and extrapolating the sample results to forecast and measure behaviors of larger audiences. Advertising time slots during programming that is forecast to attract a large number of viewers is then typically sold at higher prices per unit than time slots during programming that is forecast to attract fewer viewers.

From the standpoint of television networks, website publishers, consumer electronics device manufacturers and others that are seeking to sell advertising space, accurate viewership forecasts are important so that potential revenue opportunities are not missed and demands for refunds by advertisers (when actual viewership fails to live up to its projected forecast) are minimized. From the standpoint of the advertisers, accurate viewership measurements are needed in order to ensure that advertising funds were properly allocated in ways designed to maximize their return.

As the number of available media channels and the variety of media programming has increased, the ability to accurately predict media viewership has become more and more challenging. In the case of television advertising, increased numbers of television channels, along with a rising number and variety of programs which populate those channels, have spawned ever increasing numbers of available programs for consumers to view and available advertising time slots which now must be considered for purchase by advertisers and sale by television networks. New methods of distribution for television programming such as streaming on websites such as Hulu™, "over-the-top" devices such as Boxxee™, Apple TV™ and iPads™—which deliver content over the top of the traditional cable company or satellite TV service provided set top boxes directly to consumer television sets via software or an alternate hardware device—are creating new kinds of viewing events and advertising inventory. However, direct viewing activity data is not always available for all of the channel, program and advertisement combinations. Even where such data exists, by itself it may be an insufficient basis for accurate viewership forecasting. For example, lack of reliable audience samples using existing estimation methods for some networks may result in inaccurate predictions of viewership for those networks. Additionally, some networks are not measured at all. The inaccuracies of viewership prediction are compounded when viewership includes multiple media. For example, existing methods of prediction of television cannot be transformed to accurately predict viewership spanning television, websites, consumer electronic devices and software applications. Accordingly, what are needed are improved methods and systems for media viewership forecasting.

SUMMARY OF THE INVENTION

Methods of forecasting viewership consistent with embodiments of the present invention provide for receipt of various viewership data sets from a plurality of data sources and, for each data set, organization of the viewership information in a series of data with consistent time intervals (time series), and comparison of each time series representation of each data set to one another to identify pattern discrepancies (pattern comparison) in the data sets and validate the measures (cross validation). The pattern comparison and cross validation is the basis of "fusing" or combining the data sets. Those data sets that appear to include untrustworthy data, as determined from the comparison, may be eliminated from further consideration and/or normalized. The data from trustworthy data sets may be compared to each other to determine relationships between the respective data sets and historical measures of the viewership information, and future viewership of the designated item may be forecast using a forecasting model that may include coefficients (factors) identified by the comparisons (factoring). The forecasting model may be any of several models including but not limited to neural networks, tree based and/or Bayesian multivariate analysis. The time intervals of each time series may be variable depending on what item of viewership is being forecast. Organizing each data set's viewership information in a time series may include imputing missing data in the respective data sets. The factoring may include determining regression coefficients describing transforms between any two of the data sets, thereby allowing for projections to be made from small sample data sets, etc. The transforms of the data through factoring allows one data set to be substituted for another. Data sets or parts of respective data sets may also be combined to form a plurality of samples that represent different aspects of viewership. The forecast viewership may ultimately be verified against actual viewership and the forecast model(s) revised to account for differences therebetween. Each data set, combination of data sets, model and time interval which created a forecast may be scored against actual viewership measures to determine which delivers the most accurate forecast. Further embodiments of the invention are described in greater detail below.

BRIEF DESCRIPTION OF THE DRAWINGS

The present invention is illustrated by way of example, and not limitation, in the figures of the accompanying drawings in which.

DETAILED DESCRIPTION

Figure 1:
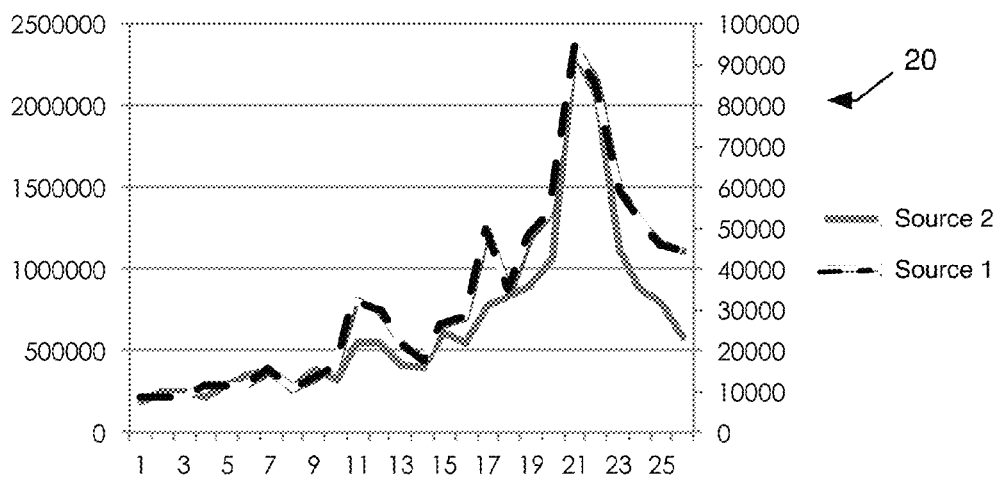
FIG. 1 illustrates an example of viewership data arranged in a time series.

Described herein are systems and methods for improved projection of media viewership using viewership and other data. At the outset, data sets are arranged in time series for analysis. Such time series analyses allow for establishment of accurate base lines, which can be used to evaluate new viewership information to identify potential inaccuracies or trends. Further, the analyses can be used to forecast future viewership to allow for the purchase and sale of advertising. In some instances, using methods in accordance with embodiments of the present invention, one can identify and correlate items in viewership data for websites, TV networks, tablet applications, TV programs and/or viewers (such as the demographics or age of viewers, usage behaviors, etc.) that are not are present in one or more data sets (e.g., those obtained for unmeasured media) with corresponding items present in network, websites or other data sets for media covered by traditional ratings companies, and thereby determine counts of viewers (or proxies for counts of viewers) and/or demographic information regarding such viewers where such information may not otherwise be available.

Methods of forecasting viewership consistent with embodiments of the present invention provide for receipt of various viewership data sets from a plurality of data sources. For each data set, viewership information is organized in a series with consistent time intervals (referred to herein as a time series), and each time series representation of each data set is compared to one another to identify pattern discrepancies (pattern comparison) in the data sets and validate the measures (cross validation). The pattern comparison and cross validation of the data sets may be used as a basis for "fusing" or combining the data sets. Those data sets that appear to include untrustworthy data, as determined from the comparison, may be eliminated from further consideration and/or normalized. The data from trustworthy data sets may be compared to each other to determine relationships between the respective data sets and historical measures of the viewership information, and future viewership of the designated item may be forecast using a forecasting model that may include coefficients (factors) identified by the comparisons (factoring). The forecasting model may be any of several models including but not limited to neural networks, tree-based and/or Bayesian multivariate analysis. The factoring may include determining regression coefficients describing transforms between any two of the data sets, thereby allowing for projections to be made from small sample data sets, etc. The transforms of the data through factoring allows one data set to be substituted for another.

The time intervals of each time series may be variable depending on what item of viewership is being forecast and organizing each data set's viewership information in a time series may include imputing missing data in the respective data sets. Data sets or parts of respective data sets may also be combined to form a plurality of samples that represent different aspects of viewership.

The forecast viewership may ultimately be verified against actual viewership and the forecast model(s) revised to account for differences there between. Each data set, combination of data sets, model and time interval that contributed to a forecast may be scored against actual viewership measures to determine which combination delivers the most accurate forecast.

Viewership information for use in conjunction with the present methods and systems may be obtained from a variety of sources. For example, viewership information may be obtained from media ratings and measurement companies (e.g., Nielsen Media Research, Comscore, Arbitron, etc.), television networks, television service providers (e.g., cable television providers, satellite television providers, etc.), website visit logs, consumer electronics devices (e.g., Smart TVs, PCs, tablet devices, phones, etc.), and other sources. Additionally, data may be obtained from sources unrelated to media or media viewership (e.g., weather information, population census, etc.). It is often the case that data collected from different sources will reflect different information. For example, it is possible, even likely, that data from different sources will be captured at different times and/or over different intervals. Nevertheless, such disparate data can be combined together and used in a cohesive manner by considering the patterns represented thereby.

Consider, for example, FIG. 1, which illustrates an example of viewership data for a single television program reported by two different sources. As shown in the table 10, the data for each source can be aligned in time (for example the time at which the data was captured). Here, a time series, such as represented by the data in table 10, is a sequence of observations organized in time and/or space. Intervals between or over which data captures occur may be any convenient time intervals (e.g., seconds, minutes, hours, days, weeks, etc.). Spatial alignment may take into consideration geographic observations, demographic observations, network observations, etc.

In this example the data in table 10 is "counts", a representation of the number of items being recorded. For different data sources, the items being recorded may be viewers, set top boxes, website visits, or other items. Counts may be regarded as unitless quantities for purposes of the present discussion. Indeed, it will often be the case that counts for different data sources will be expressed in different units, hence, treating the counts as unitless will simplify the present description.

The counts may represent raw data collected from the data sources, source 1, source 2, etc., or may represent processed (e.g., weighted, etc.) data from one or more of these sources, or both. The data sources may be television set-top-boxes, ratings and measurement company estimates, website visit logs, advertising server logs, hardware usage logs, software application usage logs, weather service information, or other sources. Each data source will report data according to its own preferences and methodologies. Embodiments of the present invention order the data reported by each data source in time in a time sequence (e.g., according to its capture time), for example in a table similar to table 10. In some instances, count data may be connected (joined) in a table with other data concerning media program schedules, content metadata, advertising spot schedules, population census information, weather information, government statistics such as unemployment measures etc., to provide fully fused data sets.

Because the counts reported by different data sources may represent different data items, the magnitudes of the counts across different data sources may be very different. The absolute magnitudes of the counts are not especially important for purposes of the present invention. What is important, however, are the relative magnitudes of the counts within each data set reported by each data source. Notice that when the different data sets are graphed on scales appropriate for each data set and against a common time axis, as in plot 20, the two data sets can be readily compared to one another. Relative maxima and minima between the data sets become quite apparent and, just as important, discrepancies between the reported maxima and minima (and data points there between) also stand out.

By aligning the data sets in time, for example in the fashion illustrated in plot 20, one can correlate individual data sets with one another, even though the actual data reported within each data set may be quite disparate. The alignment may be performed at any level of granularity and different alignments may be examined to determine a "best fit" between the different data sets. Although the example shown in FIG. 1 is for two different data sets, in practice any number of different data sets may be examined collectively in this fashion.

Figure 2:
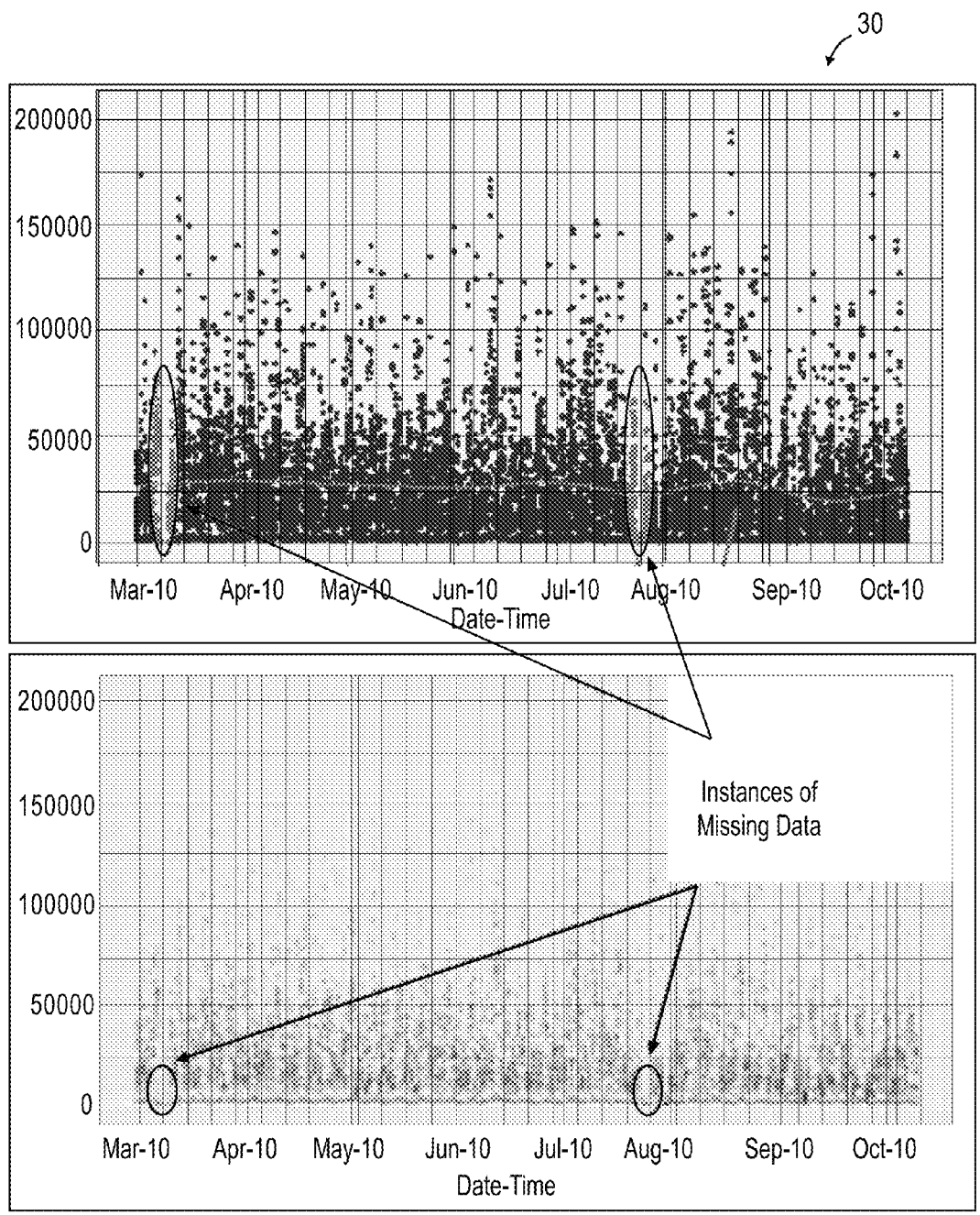
FIG. 2 illustrates problems with real world data, which may include gaps.

Aligning the data in time series can also help in identifying missing data items. The data shown in FIG. 1 is somewhat idealized in its representation. FIG. 2, on the other hand, shows more typical examples of data received from data sources. Plots 30 and 40 may represent data for different television channels as reported by a television provider (e.g., from set top box log information), a ratings service, etc. Notice that in some instances data is missing for various time periods (e.g., hours, days, weeks, etc.). This may be indicative of any of a number of problems (e.g., errors in data collection, transmission, reception, storage, etc.).

Data gaps, such as those represented in FIG. 2, can be accommodated through the time series alignments of different data sets, as shown in FIG. 1. For example, if data from one source, say source 1, is missing, it can be interpolated or imputed based on common patterns exhibited by data sets from different data sources, e.g., source 2. Consider, for example, a data set A and a data set B. If A and B (or subsets thereof) are aligned so that common patterns present in each of A and B (or the respective subsets) are correlated with one another where data is present in each data set, then where data is missing from one data set, say A, it may be imputed (in patterns even if not in magnitude) from corresponding data present in the other data set, B, and vice versa. This technique can also be applied across a plurality of more than two data sets. More generally then, by aligning different data sets in time and imputing individual missing data items based on patterns formed by count data in one or more data sets (which may be complete for the time period of interest), gaps in data sets reported by other sources may be replaced by estimates (scaled appropriately for the subject data set) obtained by such projections. By estimating missing data in this fashion, more accurate viewership forecasts may be made from the data sets in which data gaps are present.

Figure 3:
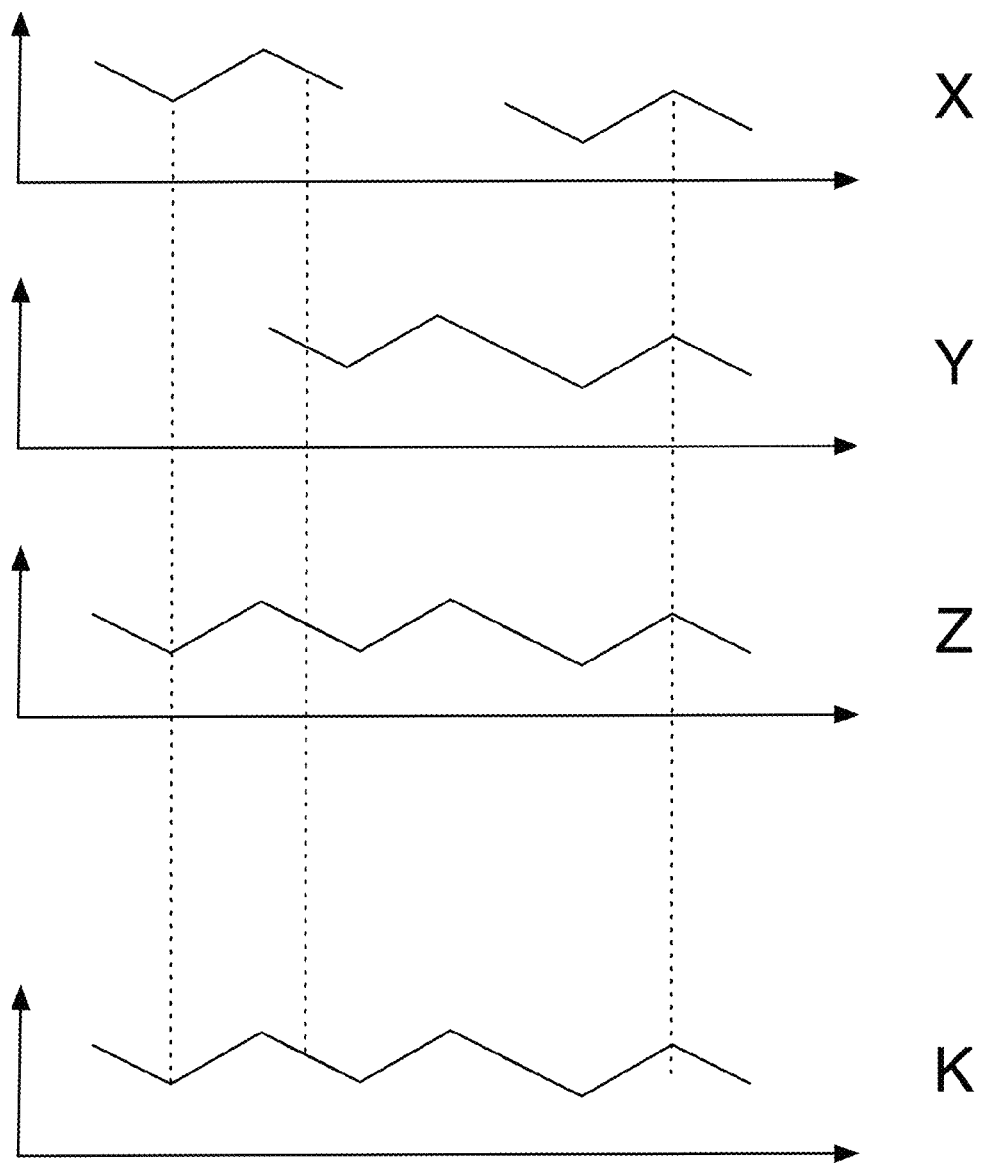
FIG. 3 illustrates the use of data fusion to produce a predictor data set for a data set from a known source.

In addition to interpolation between data sets, data set fusion is also facilitated by the time series alignment described above. By fusion, we mean combining two or more data sets (or subsets thereof) to produce a third (or other) data set that may exhibit characteristics of yet a further data set (or a subset of the further data set). Consider, for example, a situation such as that illustrated in FIG. 3 where data sets X and Y (where X and Y may be highly correlated with one another but each may be incomplete in some fashion) are combined (fused) to produce a data set Z, and data set Z is then compared (through time series analysis) with a data set K from a known source. If data set Z is highly correlated with data set K (in pattern rather than absolute data values) then data set Z can serve as a predictor for the items measured by data set K should data set K also exhibit missing items or become altogether unavailable.

The reverse may also be true. That is, statistically meaningful correlations with a known data set may allow for inferring attributes of viewership in a data set for which such attributes are not otherwise available. While Nielsen, Kantar Media, Comscore and other organizations provide reports of viewership information for a number of media properties, which information typically includes values for a variety of attributes of said viewership (e.g., viewership demographic information), not all networks or other media are covered by these reports. These are so-called "dark networks" or "dark media". Set-top-box logs, content management system logs, advertising delivery system log or other data sources may provide raw viewership information for such dark media, but such information is typically devoid of any meaningful attribute information and therefore has limited value. For example, knowing that a certain number of viewers were watching a particular network at a particular time and/or for a particular time period, while interesting, is less useful than knowing the age, sex, median household income, etc., of those viewers. If time series representations of dark medium data is analyzed and is shown to be highly correlated with time series data from a covered medium (i.e., one that is reported on by a media measurement service), then attribute information concerning the viewership of the covered medium may be imputed to the viewership of the dark medium in order to infer previously unknown information concerning that dark medium viewership. Such comparisons may require the use of viewership information for different time periods in order to account for viewership habits, seasonal affects, or other variables.

Examining data from various data sources in a time series also permits quality control operations. Data so formatted can be compared with historical data patterns to reveal deviations from those historical patterns. Such deviations are not necessarily indicative of errors in the data (or data collection techniques), rather they are indicators of the need for further evaluation. Such deviations may be accounted for by changes in media content, special promotions, or other identifiable events. Suspect data within a data set be revealed through analysis of statistical measures of a time series representation of the data set.

Figure 4:
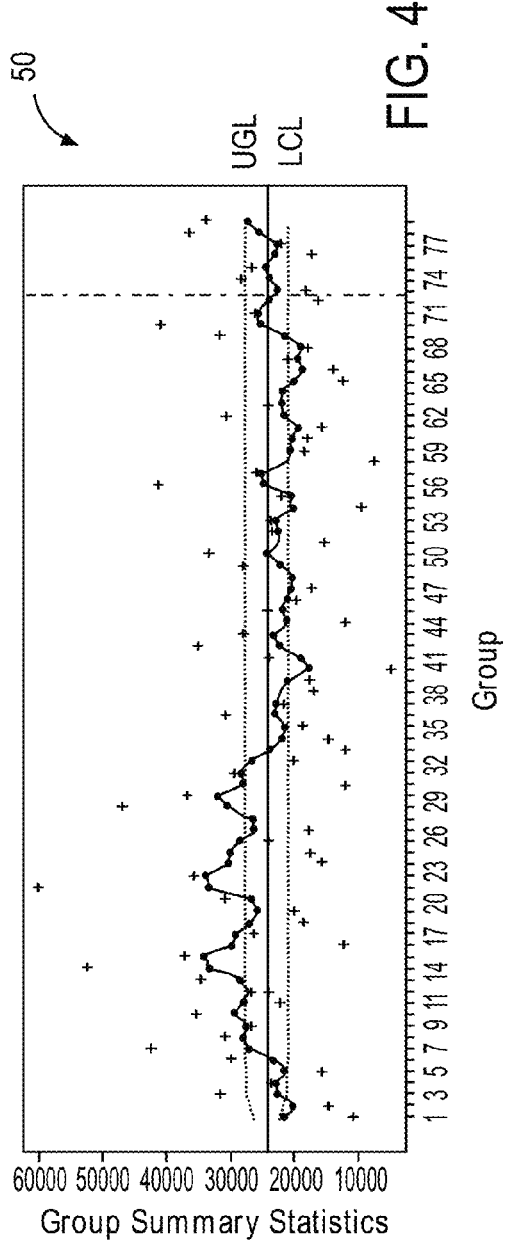
FIG. 4 illustrates analysis of a time series of viewership data to identify outliers requiring further investigation.

Consider, for example, plot 50 shown in FIG. 4, which illustrates count data received from a data source and analyzed using an exponentially weighted, moving average (EWMA) technique. One benefit of this technique is that it is rather straight forward in terms of its implementation. The EWMA process is also highly scalable, making it useful for evaluating large numbers of data sets and/or data sources. The EWMA technique detects small shifts in process mean or variance. At its core, the process computes a weighted average, using a weighting factor $\lambda$, of a current data set (e.g., sampled viewership observations) and historical observations of similar events. For example, a base line of a data set may be defined as $\mu_0$ and upper and lower confidence intervals (UCL, LCL) set at $$\pm L\sigma\sqrt{\frac{\lambda}{2-\lambda}},$$

where $\sigma$ is the standard deviation of the data set. An example, for L=2, is shown in plot 50 of FIG. 4.

As demonstrated in this example, count data (or other data) may be represented as a time series and the mean and upper and lower confidence limits superimposed over the data to reveal outliers (data points outside of the confidence intervals). The outliers are assessed against other data sets to determine whether similar patterns exist within those data sets. If so, one can be confident that the data represents actual viewer behaviors. If the patterns are not reproduced in other time series of data sets, the outliers may be regarded as suspect, possibly invalid. In such instances, the outliers may be disregarded.

Figure 5:
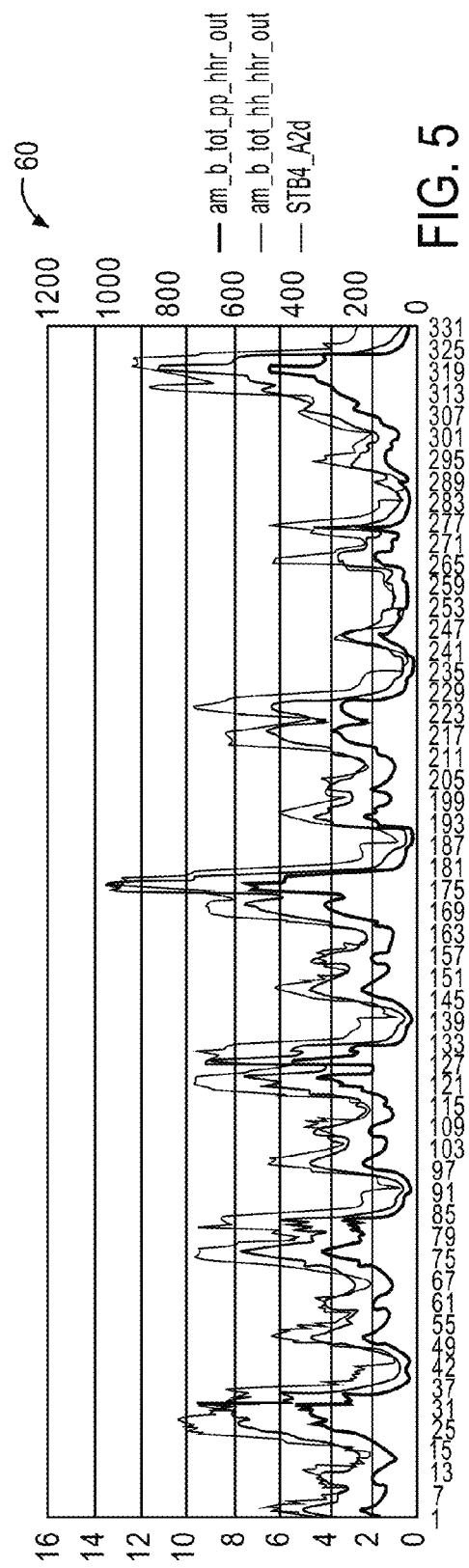
FIG. 5 illustrates alignment of viewership or other data from various sources to validate data sets against one another.

FIG. 5 presents a further view, in the form of a plot 60, of this method of analysis using data sets from different data sources to validate data in each data set. The different data sets are plotted along a common time axis, and may be individually scaled so as to reflect approximately similar magnitudes of maxima and/or minima. Common patterns amongst the data from the different data sets indicate that each data set is likely to be reporting actual viewer behavior. Where discrepancies exist, one or more of the data sets may be suspect.

By observing and recording these kinds of commonalities and/or discrepancies between and among data sets from different data sources, more accurate viewership forecasts can be made. For example, if analysis of historical data among different data sets reveal common trends in viewer behaviors, one can be reasonably certain that the actual viewer behavior is represented in the different data sets and forecasts based thereon may be treated with greater confidence than in cases where large discrepancies in viewer behavior is observed among the different data sets. Aligning data sets so as to permit this kind of data quality check may require shifting one or more of the data sets in time or employing time warping (e.g., non-linear alignment of data sets) so as to account for differences in data capture times and/or durations.

Other methods of time series analysis may also be employed. For example, both linear and non-linear analysis tools may be employed. Examples of linear analysis tools include ARIMA (autoregressive integrated moving average) models, which may be employed to analyze time series data so as to forecast future viewer behaviors. Examples of non-linear tools include neural networks and Bayesian multivariate analysis tools. Of course, other forecasting models or techniques may also be employed. There are generally three steps involved in such forecasting. First, a model that accurately describes the data under observation is determined. Here, as indicated, models such as ARIMA, seasonal ARIMA, or others can be used. A "best fit" for historical viewership data (e.g., as verified through the quality review procedures described above) is determined and used as the model. Second, a forecast period is selected and some assumptions concerning the viewership behavior over that period may be employed. For example, one could assume that viewership behaviors over the forecast period will not be meaningfully different than those observed over the model training (definition) period. Alternatively, changes in viewership behaviors as determined from historical data sets could be assumed. Third, using the projected viewership behaviors and the selected model, a forecast of future viewership behaviors is determined. This forecast may be evaluated against or combined with forecasts produced using different models in order to determine an overall "best" forecast.

The forecasts may subsequently be reviewed against observed viewership data obtained from one or more data sources to revise or update the forecast model. For example, actual viewership data (e.g., verified using the quality control procedures discussed above), may be obtained for the forecast data period and compared with the forecast viewership data. Where the observed data agrees well with the forecast, this is an indication that the selected model (and any assumptions) accurately reflects the real world viewer behaviors. Where discrepancies exist, assumptions regarding viewership behaviors and/or model selections may need to be revised.

Above it was noted that time warping may need to be employed in order to align data sets from different data sources with one another for use in the present time series analysis. This is also referred to as "factoring". That is, one or more factors (or transforms) may need to be determined in order to accurately map one data set to another. In one example, the factors are coefficients of a regression function that describes the mapping. These factors can also be used to extrapolate viewership behaviors revealed in a data set to gain insight into national, regional or other viewership behaviors.

In addition to factors that allow for these and other projections, the present time series analysis allows for dark media measurement forecasts. As mentioned above, there are a number of television networks and media websites that are not presently covered by national ratings services due to the inaccuracy of current measures (e.g. small sample sizes) (hence they are "dark" in terms of visibility regarding viewership behaviors). Nevertheless, these networks and sites attract viewers that may be of interest to advertisers. Without ratings data, however, advertisers have no way of knowing whether purchasing advertising time on the dark media is worthwhile.

The present time series analysis techniques allow for insight into viewership behaviors for dark media by permitting pattern analysis in viewership data captured for such networks. For example, if directly measured data such as set top box count information is available for the dark media, that count data can be represented in a time series and compared with similarly organized data from another source. If the data from the other source is known to represent certain viewership, for example women 20-35 years in age, and patterns of that viewership can be observed in the data from the dark network, it may be possible to make accurate predictions regarding the characteristics of the viewers and behaviors of the viewership of the dark network.

Figure 6:
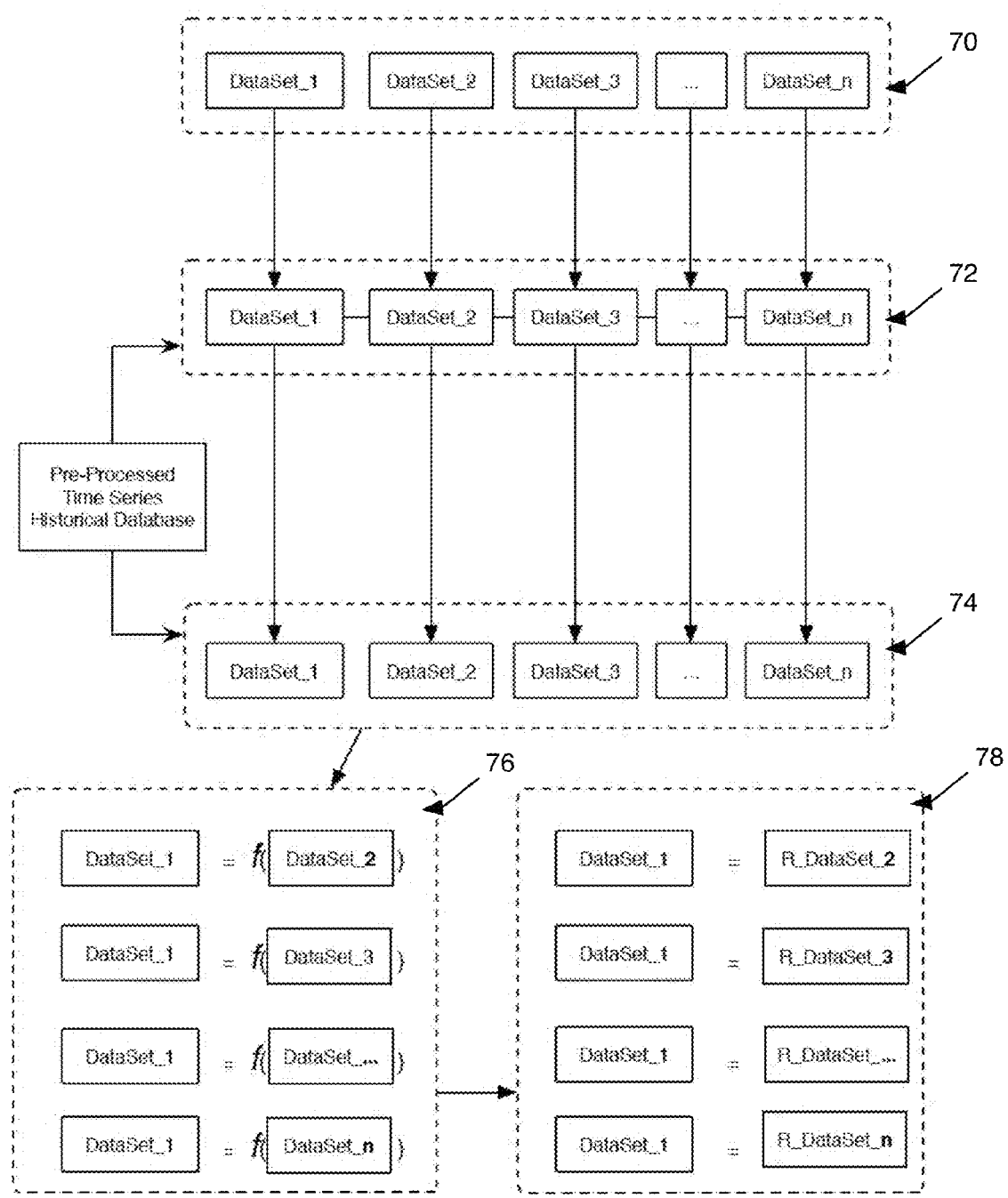
FIG. 6 illustrates graphically a methodology for processing raw viewership data and determining relationships between data sets and fusion of data sets in accordance with embodiments of the present invention.

FIG. 6 summarizes some of the above-described processes in graphical form. Initially, a number of data sets 70 are collected (e.g., asynchronously) from a variety of data sources. The data sets may include count information regarding viewership for one or more television networks, programs, advertising spots, etc. The raw data sets 70 are each arranged in time series 72, and compared with one another (and, optionally, with historical ones of the data sets) to check the quality of the data reported by each source as against similar data reported by other sources. For example, data reported by a television provider and a national ratings service provider may be checked against each other to confirm that each exhibits similar patterns in their respective time series thereby providing assurance that the data reported by each source is accurate and trustworthy. In addition, any missing data items in ones of the raw data sets may be imputed based on the pattern similarities exhibited by other data sets. Ultimately, processed, time series aligned data sets 74 are produced for each data source.

The processed data sets 74 may then be factored 76 with regard to one another. That is, mappings may be developed so as to express one data set as a function of one or more of the other data sets. Typically, this will involve regression analysis so that individual factors for each of the data sets with respect to individual ones of the other data sets will be developed. Finally, using the factors so developed, the individual or combined data sets can be rescaled 78 to approximate national (or other) currency results. The quality of the results may be assessed using generally accepted statistical quality measures (e.g., root mean square error computations, mean absolute percentage estimate computations, etc.).

Figure 7:
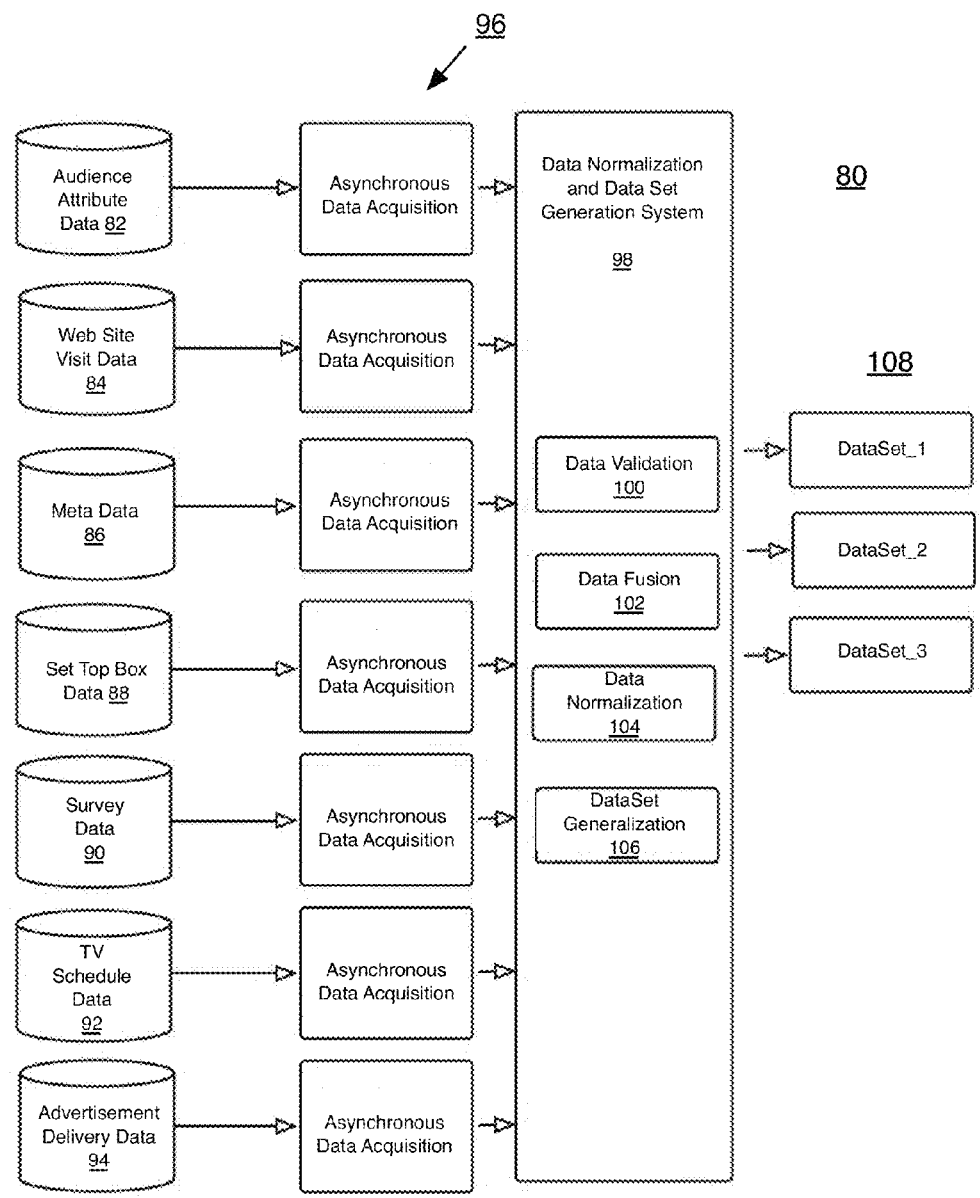
FIG. 7 illustrates further aspects of the collection and processing operations for viewership data in accordance with embodiments of the present invention.

FIG. 7 illustrates further details regarding the data acquisition process 80. As shown, data may be collected from a variety of sources. The data may be audience attribute data 82, web site visit data 84, meta data 86, set top box data 88, survey data 90, televisions schedule data 92, advertisement delivery data 84, etc. Each data set is acquired 96 in a manner appropriate for the respective data set and the collection activities may be performed asynchronously from one another. Once collected, each raw data set is normalized 98 and processed data sets 108 are produced therefrom. As indicated above, this may include validating a raw data set 106 against other raw data sets (e.g., to allow for imputation of data to fill in gaps, and/or to identify suspect data), joining one data set to another to form a fused data set, normalizing each data set 104, and finally generating the processed data set 106.

Figure 8:
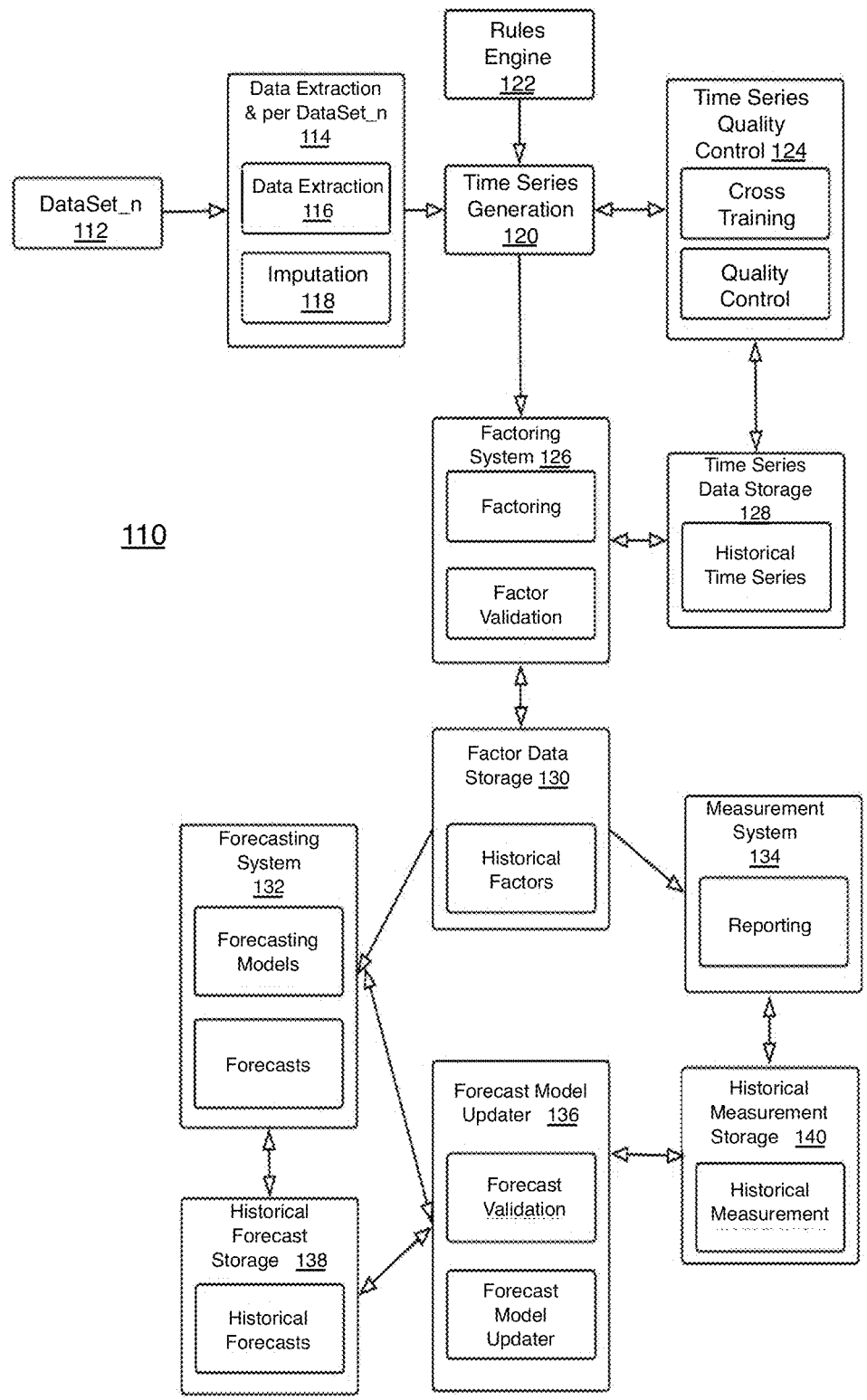
FIG. 8 illustrates a methodology for forecasting viewership using data collected and processed in accordance with embodiments of the present invention.

FIG. 8 illustrates a system 110 configured in accordance with an embodiment of the invention. As described above, a data set 112 is extracted from a data source by a data set extraction module 114, which may include one or more data extraction interfaces 116 tailored for specific applications. The data extraction module 114 may impute missing data 118 into a raw data set to fill in gaps in that data set.

The extracted data set is then expressed in time series 120 according to rules 122 for such expressions and subjected to quality control 124 by being evaluated against other data sets from other data sources to determine whether the newly extracted data set is trustworthy. These operations may be performed by a time series generation module, which subsequently passes the validated time series data to a factoring system 126.

The factoring system uses historical time series data retrieved from a data store 128 along with other current data sets to compute factors for the subject data set. The factors may be validated as described above and stored 130 for use in connection with forecasts.

The stored factors may be employed by a forecasting system 132 to generate viewership forecasts, based on one or more forecast models. The forecast models may use or employ the coefficients identified during the factoring operation. Factors may be applied before or after the forecast is generated. These models are subject to periodic updating 136, according to measurements of actual viewership behavior 134 received from television networks, advertisers, television providers, etc. 134. The reporting data is stored 140 for use in this regard and updated forecast models may likewise be stored 138 for future use. In other embodiments, forecasting may be performed without the use of the factors.

Figure 9:
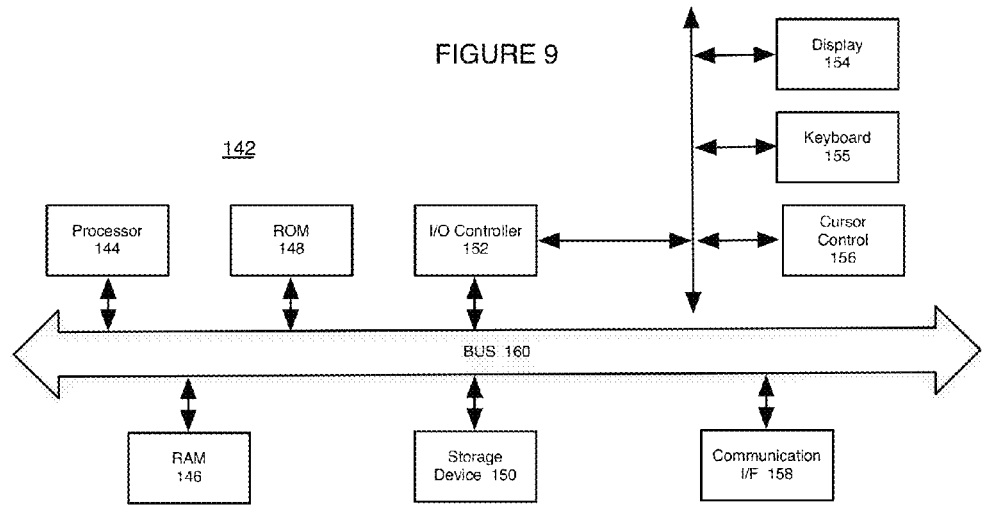
FIGS. 9 and 10 illustrate an example of a computer system on which embodiments of the present invention may be instantiated.

FIG. 9 of the accompanying drawings illustrates a computer system 142, also known as a data processing system, on which the operations, processes, modules, methods, and systems described and shown in the foregoing figures of this disclosure are intended to operate as sets of instructions (e.g., software), also known as computer-implemented methods. The computer system depicted in FIG. 8 is generally representative of any client device or server. The computer system includes at least one processor 144 (e.g., a Central Processing Unit (CPU), a Graphics Processing Unit (GPU) or both), Random Access Memory (RAM) 146 (e.g., flash memory, Dynamic Random Access Memory (DRAM), Static Random Access Memory (SRAM), Synchronous DRAM (SDRAM), etc.), Read Only Memory (ROM) 148 (e.g., Erasable Programmable Read Only Memory (EPROM), Electrically Erasable Programmable Read Only Memory (EEPROM)), storage device (e.g., hard disk drive, solid state storage device, etc.) 150 whether built-in, internal, external and/or removable), communication interface device 158, and input/output (I/O) controller 152, which are communicatively coupled with one another other via one or more busses 160.

I/O controller 152 may interface computer system 142 with display 154 (e.g., Liquid Crystal Display (LCD), a Cathode Ray Tube (CRT) or a touch screen), alpha-numeric input device 155 (e.g., a keyboard, phone pad, touch screen), cursor control device 156 (e.g., a mouse, joy-stick, touch-pad), and one or more other peripherals (e.g., a speaker, microphone, camera, fingerprint scanner, web-cam, etc.). Communication interface device 158 may include, for example, a network interface card (NIC), Ethernet card and/or modem, and may be communicatively coupled to a network. Alternatively, or in addition, communication interface device 158 may be a wireless network interface device, for example in the case of a mobile device communicatively coupled to a network (e.g., a cellular, VoIP and/or WiFi network). If computer system 142 is a server, alphanumeric input device 155, cursor control device 156, display 154, and other peripherals may be omitted.

One or more of ROM 148, RAM 146, and storage device 150 includes a computer-readable storage medium on which is stored one or more sets of computer-readable instructions (e.g., software) embodying one or more of the operations described herein. The computer-readable storage medium may include a single medium or multiple media (e.g., a centralized or distributed database, and/or associated caches and servers) that store the one or more sets of computer-readable instructions. The term "computer-readable storage medium" shall also be taken to include any physical/tangible (i.e., non-transitory) medium that is capable of storing or encoding a set of instructions for execution by processor 144.

Figure 10:
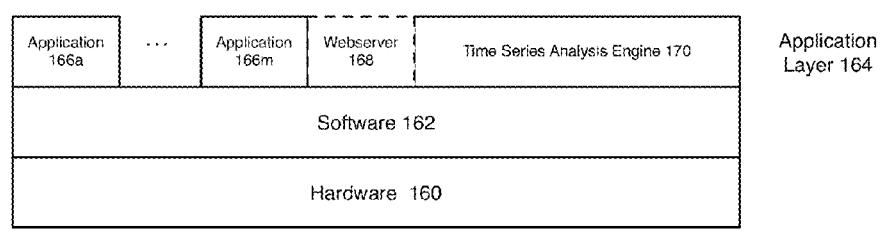

FIG. 10 illustrates computer system 142 from the point of view of its software architecture. The various hardware components of computer system 142 are represented as a hardware layer 160. An operating system 162 abstracts the hardware layer and acts as a host for various applications 166a-166m, that run on computer system 142. Applications 166a-166m exist in a so-called application layer 164, which in the case of a server may also include a web server application 168. Such a web server may be hosted to provide an interface by which clients may communicate with the server for performing various operations. The computer system 142 also includes the time series analysis engine 170, configured to provide the various operations described above.

While numerous embodiments of the present invention have been described herein, it is not intended that such description limit the scope and/or broader spirit of the present invention. Rather, the scope of the present invention is defined only by the claims which follow.

What is claimed is:

1. A computer-readable memory storing one or more programs, the one or more programs comprising instructions, which when executed by a processor, cause the processor to perform steps, comprising:

receiving from a plurality of heterogeneous data sources, inhomogeneous data sets of differing data types and obtaining from the data sets viewership information for a designated item, wherein the inhomogeneous data sets include viewership information obtained from media ratings and measurement companies;

for each data set, converting the obtained viewership information to a time series using a common time axis across the data sets, comparing each time series representation of each data set to one another to identify pattern discrepancies in the data sets, and for any of the data sets which appear to include untrustworthy data as determined from the comparison, normalizing said data sets which appear to include untrustworthy data to generate normalized data sets through comparisons with historical data sets concerning viewership information for data sources represented in said data sets which appear to include untrustworthy data, and using the time series as an alignment to combine data from two or more of the data sets to generate a fused data set;

for those of the data sets deemed to include trustworthy viewership information and the normalized data sets, factoring each respective data set to determine a relationship between the respective data set and historical measures of the viewership information; and forecasting future viewership of the designated item using a forecasting model that includes coefficients identified by the factoring, the coefficients allowing one data set to be substituted for another data set.

2. The computer-readable memory of claim 1, wherein organizing the viewership information in a time series includes imputing missing data in the respective data sets.

3. The computer-readable memory of claim 1, wherein the forecasting model has coefficients derived from comparisons of the time series representations of the data sets across a plurality of time periods and data sources.

4. The computer-readable memory of claim 1, wherein the forecasting model comprises one of: a non-linear analysis tool or a linear analysis tool.

5. The computer-readable memory of claim 1, wherein one or more of the data sets comprise data imputed based on patterns of one or more others of the data sets.

6. The computer-readable memory of claim 1, wherein the time interval of each time series depends on an item of viewership being forecast.

7. The computer-readable memory of claim 1, wherein one or more of the data sets comprise data which is a combination of data from two or more others of the data sets.

8. The computer-readable memory of claim 1, wherein the factoring includes determining regression coefficients describing transforms between any two of the data sets.

9. The computer-readable memory of claim 1, further comprising verifying the forecast viewership against actual viewership and revising the forecast model to account for differences there between.

10. The computer-readable memory of claim 9, further comprising, for each data set, combination of data sets, model or time interval which created a forecast, scoring said forecast against actual viewership to determine a most accurate forecasting combination.

11. A computer-implemented method of forecasting viewership for a designated item, comprising:

for each of a plurality of inhomogeneous data sets of differing data types received from a corresponding plurality of heterogeneous data sources, converting the obtained data sets to a plurality of time series using a common time axis across the data sets, comparing each time series representation of each data set to one another to identify pattern discrepancies in the data sets, wherein the inhomogeneous data sets include viewership information obtained from media ratings and measurement companies and prior to said comparing with one another, one or more of said data sets are normalized through comparisons with historical data sets concerning viewership information for respective ones of the data sources represented therein, validating measures from the compared data sets across the data sets, using the pattern comparisons and cross validations of the data sets and the common time axis as a basis for fusing two or more of the data sets to generate a fused data set, and forecasting future viewership for the designated item using a model based on the fused data set.

12. The method of claim 11, wherein data from the data sets is compared to each other to determine relationships between respective data sets and historical measures of viewership information, and future viewership is forecast using a forecasting model that includes coefficients identified by factoring.

13. The method of claim 12, wherein a forecasting model used to produce the forecast is one of a non-linear analysis tool or a linear analysis tool.

14. The method of claim 12, wherein the factoring includes determining regression coefficients describing transforms between any two of the data sets.

15. The method of claim 12 wherein time intervals of each time series representation depends on an item of viewership being forecast.

16. The method of claim 11 wherein organizing at least one respective data set's viewership information in a time series representation includes imputing missing data in the respective data set.

17. The method of claim 11, wherein two or more of the data sets or parts thereof are combined to form a plurality of samples that represent different aspects of viewership.

18. The method of claim 12, wherein a forecast viewership is verified against actual viewership and a forecasting model used to produce the forecast is revised to account for differences there between.

* * * * *